Feb. 20, 1923.
R. G. POLLOCK.
FRICTION FEED MECHANISM FOR SURFACE GRINDERS.
FILED APR. 29, 1922.
1,446,271.
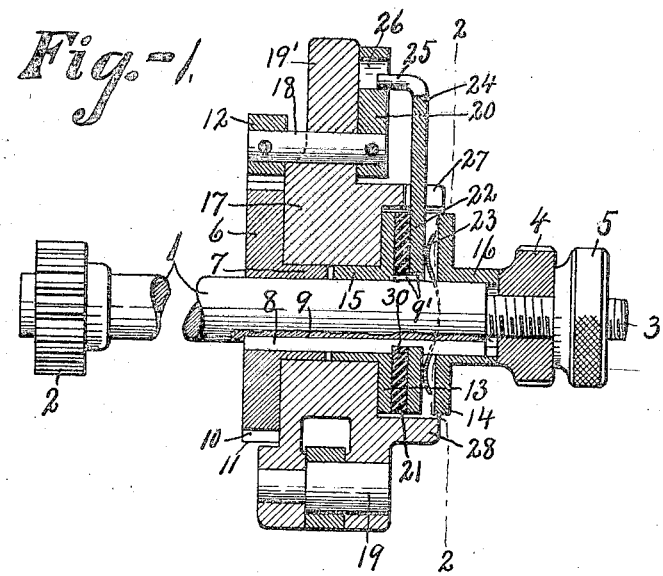
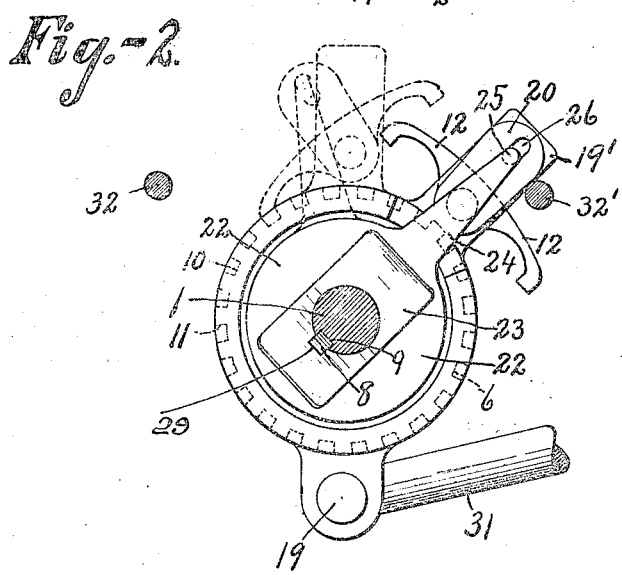
INVENTOR
R. G. Pollock
BY
Howard P. Denison
ATTORNEY.

Patented Feb. 20, 1923.

UNITED STATES PATENT OFFICE.

1,446,271

ROBERT G. POLLOCK, OF SYRACUSE, NEW YORK.

FRICTION FEED MECHANISM FOR SURFACE GRINDERS.

Application filed April 29, 1922. Serial No. 557,407.

*To all whom it may concern:*

Be it known that I, ROBERT G. POLLOCK, a citizen of the United States of America, of Syracuse, in the county of Onondaga, in the State of New York, have invented new and useful Improvements in Friction Feed Mechanism for Surface Grinders, of which the following, taken in connection with the accompanying drawings, is a full, clear, and exact description.

This invention relates to a friction feed mechanism for controlling the feed of the work-supporting table transversely of its reciprocatory motion, as for example, in surface grinding machines in which the work table is mechanically reciprocated and automatically fed transversely of the direction of reciprocation for causing the grinder or other tool to operate upon different parts of the work as its direction of motion is reversed.

In machines of this character and particularly those of the Brown and Sharpe type, suitable means is provided for imparting reciprocatory motion to the work-support transversely of the grinder shaft, and additional mechanism is provided for transmitting rotary motion from the reciprocating work-support to a cross shaft or spindle carrying coaxial members keyed thereto and provided with suitable hubs for receiving and supporting an oscillating member from which rotary motion is transmitted to the cross feed screw for the work-support through the medium of a rack bar and pin and suitable pawl and ratchet mechanism not necessary to herein illustrate or describe, one of said coaxial members being provided with peripheral teeth or notches adapted to be engaged by a double pawl on the oscillating member.

This pawl is adapted to be thrown into and out of engagement with the teeth of the notched wheel by means of one or more friction disks on the same shaft or spindle and as heretofore practiced, the friction between these members has been adjusted by means of nuts engaging the threaded outer end of the shaft or spindle but considerable difficulty has been experienced by the users of these machines in preventing the backing off or loosening of the nuts due to the reverse rotation of the shaft or spindle, thereby reducing the friction and preventing positive operation of the pawl at the proper time, and the main object of my invention is to overcome these difficulties by a simple change in the friction adjusting means and thereby to assure positive engagement of the pawl with the toothed member for rocking the oscillating member and thereby effecting a positive drive of the cross feed screw through the medium of the cross bar connected to the oscillating member.

Other objects and uses relating to specific parts of my invention will be brought out in the following description.

In the drawings:

Figure 1 is a longitudinal sectional view of the friction feed device embodying the various features of my invention showing a portion of the adjacent shaft or spindle as broken away.

Figure 2 is a transverse sectional view taken on line 2—2, Figure 1.

The device shown is a part of what is commonly known as the Brown and Sharpe grinding machine and comprises a rotary shaft or spindle —1— adapted to be driven alternately in reverse directions by suitable gear connections with the reciprocating work-supporting bed or table not shown but having a pinion —2— at its inner end as a part of the driving connection with said work-supporting bed, said shaft or spindle being provided with a reduced outer end —3— engaged by an adjusting nut —4— and a lock nut —5—.

A toothed wheel —6— having an outwardly projecting hub —7— is keyed to the shaft —1— by means of a key —8— which is seated in a key-way —9— in said shaft and extending from the inner end of the face of the toothed wheel —6— to the inner end of the reduced threaded portion —3—, said wheel being provided with a series of peripheral notches —10— forming teeth —11— in uniformly spaced relation circumferentially for engagement by either end of a double pawl —12— presently described.

A pair of friction collars —13— and —14— are mounted upon the shaft —1— coaxial therewith and also coaxial with the wheel —6— and are provided, respectively, with an inwardly projecting hub —15— and an outwardly projecting hub —16—, both of which are provided with key ways for receiving the key —8— and thereby locking the same to the shaft to rotate therewith while permitting their axial adjustment thereon.

An oscillating member —17— is journaled upon the hubs —7— and —15— of the wheel —6— and collar —13— for relative rocking movement thereon and serves to receive a pawl-supporting pin —18— at one side of the shaft and a rack bar engaging pin —19— at the opposite side of the shaft, said pins —18— and —19— being parallel with the shaft —1—.

The pawl-supporting shaft —18— extends through the adjacent portion of the oscillating member —17— and is journaled therein, the double pawl —12— being centrally secured to the inner end of said shaft while the outer end of said shaft is provided with a crank arm —20— for a purpose presently described.

The collars —13— and —14— are spaced apart axially for receiving friction members —21—, —22— and —23—, the inner member —21— consisting of a circular fibre or equivalent friction disk while the member —23— is made of metal engaging the outer face of the disk —21— and provided with a radially projecting arm —24— having an inwardly projecting offset portion —25— engaged in a radially elongated slot —26— in the outer end of the crank arm —20— some distance from the spindle —18—, the intermediate portion of said arm passing through a circumferentially elongated recess —27— in an outwardly projecting flange —28— of the oscillating member —17—.

The member —23— preferably consists of a substantially rectangular disk of spring metal bow-shaped longitudinally and having its ends bearing against the outer face of the disk —22— and its outwardly bowed central portion bearing against the outer face of the collar —14— which is interposed between the inner end of the adjusting nut —4— and spring disk —23—.

This spring disk —23— is also provided with a key-way —29— for receiving the adjacent portion of the key —8— and thereby causing the disk to rotate with the shaft —1— while permitting its axial movement thereon.

The portion of the outer edge of the key —8— registering with the disks —21— and —22— is cut away at —30— to a depth coincident with the periphery of the shaft —1— and of a length substantially equal to the combined thicknesses of the disks —21— and —22— whereby the shaft and disks —21— and —22— are free to rotate relatively to each other while the disks are held against axial movement relatively to the key by the end walls of the recess —30—.

A rack bar —31— commonly used in this type of machine is pivotally connected by the pin —19— to the oscillating member —17— to be reciprocated endwise thereby for transmitting motion to the cross feed screw for the work-support not shown in a manner well known and not necessary to herein illustrate or describe.

When the pawls —12— are in their neutral positions, the crank arm —20— is registered with a radially projecting arm —19'— of the oscillating member —17—, both arms —19'— and —20— being of substantially the same width circumferentially so that the opposite edges of one will be substantially coincident with the corresponding edges of the pawl as shown by full lines in Figure 2.

The amount of transverse cross feed of the work-support depends upon the arc of movement of the oscillating member —17— and is regulated by a pair of stops —32— and —32'—, which are adjustable circumferentially in the usual manner around the axis of the shaft —1— in the path of movement of the arms —19'— and —20— and serve to trip the pawls —12— to their neutral positions and thereby to determine the limit of the oscillating movement of the member —17— in either direction for stopping the transverse feed of the work-supporting table in that direction without retarding the rotation of the shaft —1— and parts keyed thereto.

That is, the shaft —1— and parts —6—, —13—, —14— and —23— are rotated first in one direction and then in a reverse direction by the reciprocation of the work-supporting carriage not shown, while the pawl-operating member —22— is driven by friction produced by the tension of the spring —23—.

*Operation.*

Assuming that the work-supporting carriage has reached the limit of its movement in one direction and that the pawls —12— and operating means therefor have assumed their neutral positions as shown in Figure 2, then as the work-supporting carriage begins to move in the opposite direction, it will impart rotary movement to the shaft —1— and also to the parts —6—, —13—, —14— and —23— which are keyed to said shaft while the friction of the parts —22— and —21— with the keyed parts —23— and —13— will cause the arm —24— of the part —22— to rock the crank arm —20— in the direction of rotation of the shaft or in this instance, to the left of the arm —19'— Figure 2 to rock the left hand pawl into engagement with one of the notches —10— of the toothed wheel —6— which is then being driven in the same direction and will cause the positive rotation of the oscillating member —17— in that direction for operating the cross feed of the work-supporting carriage through the movement of the rack arm —31— until the crank arm —20— engages the left hand stop pin —32— at which time, the crank arm and pawls controlled thereby will be restored to their neutral positions, thus stopping the further cross feed of the work-supporting table while the shaft —1— continues to be rotated by the movement of said carriage.

When the shaft —1— ceases its rotation to the left after the left hand pawl has been tripped due to the limit of movement of the work-supporting carriage and as soon as said carriage begins its return movement, the member —22— will be again operated by friction to the right Figure 2, thereby imparting a similar movement to the crank arm —20— to bring the right hand pawl into engagement with one of the notches of the toothed wheel —6— to cause the latter to positively drive the oscillating member —17— in the same direction until the crank arm —20— is again restored to its neutral position by the engagement of its right hand pin —32'— for restoring the pawls —12— to their neutral positions without retarding the continued rotary movement of the shaft —1— until the carriage reaches the limit of its return movement or starting position.

The shaft openings in the friction members —21— and —22— are of substantially the same diameter as that of the shaft except that they are provided with key ways —9'— to permit them to be placed in operative position over the outer end of the shaft and then turned to bring the key ways out of registration with the key —8— to allow those parts and also the shaft —1— to turn relatively to each other.

What I claim is:

1. In a friction feed control mechanism for surface grinding machines, the combination of a shaft rotatable in opposite directions and provided with a key-way, a toothed wheel on the shaft, a key in the key-way locking the toothed wheel to the shaft and provided with a recess extending from its outer face to the periphery of the shaft, an oscillatory member movable about the axis of the shaft relatively thereto, a pawl on the oscillatory member movable into and out of engagement with the teeth of said wheel, a friction disk journaled on the shaft in registration with said recess to turn relatively to said shaft, a friction member keyed to the shaft by said key to frictionally turn said disk with the shaft, means actuated by said friction disk for operating the pawl to engage the teeth of the ratchet wheel and thereby to cause the oscillatory member to rotate with the shaft, and means cooperating with the last named means for tripping the pawl at the end of a predetermined arc of movement of said oscillatory member.

2. In a friction feed control mechanism for surface grinding machines, the combination of a shaft rotatable in opposite directions and provided with a key-way, a toothed wheel on the shaft, a key in the key-way locking the toothed wheel to the shaft and provided with a recess extending from its outer face to the periphery of the shaft, an oscillatory member movable about the axis of the shaft relatively thereto, a pawl on the oscillatory member movable into and out of engagement with the teeth of said wheel, a friction disk journaled on the shaft in registration with said recess to turn relatively to said shaft, a friction member keyed to the shaft by said key to frictionally turn said disk with the shaft, means actuated by said friction disk for operating the pawl to engage the teeth of the ratchet wheel and thereby to cause the oscillatory member to rotate with the shaft, means cooperating with the last named means for tripping the pawl at the end of a predetermined arc of movement of said oscillatory member, and means on the shaft for adjusting the tension of the friction member.

3. The combination with a shaft rotatable in opposite directions, an oscillatory member movable about the axis of the shaft relatively thereto, means including a pawl for transmitting rotary motion from the shaft to said oscillatory member, a spring tensioned friction washer keyed to the shaft to rotate therewith, a friction disk movable about the axis of the shaft relatively thereto and frictionally driven by said washer, and means actuated by said disk for forcing the pawl to its operating position and thereby to cause the rotation of the oscillatory member with the shaft.

4. The combination with a shaft rotatable in opposite directions, an oscillatory member movable about the axis of the shaft relatively thereto, means including a pawl for transmitting rotary motion from the shaft to said oscillatory member, a spring tensioned friction washer keyed to the shaft to rotate therewith, a friction disk movable about the axis of the shaft relatively thereto and frictionally driven by said washer, means actuated by said disk for forcing the pawl to its operating position and thereby to cause the rotation of the oscillatory member with the shaft, and means cooperating with the last named means for tripping the pawl at the end of a predetermined movement of the oscillatory member.

In witness whereof I have hereunto set my hand this 26th day of April 1922.

ROBERT G. POLLOCK.

Witnesses:
H. E. CHASE,
M. C. RILL.